United States Patent

Spry

[15] 3,674,775
[45] July 4, 1972

[54] CEPHALOSPORINS VIA PENICILLIN SULFOXIDE CONVERSION

[72] Inventor: Douglas O. Spry, Indianapolis, Ind.
[73] Assignee: Eli Lilly and Company, Indianapolis, Ind.
[22] Filed: March 5, 1970
[21] Appl. No.: 16,929

[52] U.S. Cl. .................. 260/239.1, 260/243 C, 424/271, 424/246
[51] Int. Cl. ..................... C07d 99/24, C07d 99/16
[58] Field of Search ........................ 260/243 C, 239

[56] References Cited

UNITED STATES PATENTS

| | | | |
|---|---|---|---|
| 3,213,102 | 10/1965 | Tosoni et al. | 260/239.1 |
| 3,240,786 | 3/1966 | Hoover et al. | 260/239.1 |
| 3,316,273 | 4/1967 | Gottstein et al. | 260/239.1 |
| 3,453,264 | 7/1969 | Fosker et al. | 260/239.1 |
| 3,532,694 | 10/1970 | Somerfield et al. | 260/243 C |

*Primary Examiner*—Nicholas S. Rizzo
*Attorney*—Everet F. Smith and Walter E. Buting

[57] ABSTRACT

6-phthalimidopenicillanic acid ester sulfoxides and a $C_2$-$C_5$ acid anhydride heated in acidic medium afford 2β-alkanoyloxymethyl-2α-methyl- and 2α-alkanoyloxymethyl-2α-methy- and 20α-alkanoyloxymethyl-2α-methyl-6-phthalimidopenicillanic acid esters, which on oxidation form separable α-sulfoxides. 2β-Alkanoyloxymethyl-2α-methyl-6-phthalimidopenicillanic acid ester α-sulfoxides heated in acidic medium provide 3-alkanoyloxymethyl-7-phthalimido-$\Delta^3$-cephem-4-carboxylates and 3-alkanoyloxymethyl-3-hydroxy-7-phthalimidocepham-4-carboxylates readily converted to known cephalosporin antibiotics.

8 Claims, No Drawings

CEPHALOSPORINS VIA PENICILLIN SULFOXIDE CONVERSION

BACKGROUND OF THE INVENTION

The cephalosporin antibiotics have recently achieved considerable success as therapeutic agents for the treatment of infectious diseases of man. This class of antibiotics can be produced by two known general methods. In the first of these methods, cephalosporin C is produced by culturing the organism Cephalosporium acremonium, Newton and Abraham, Biochem. J., 62, 651 (1956). Cleavage of the α-aminoadipoyl side chain of cephalosporin C according to the method described in U.S. Pat. No. 3,188,311 affords 7-aminocephalosporanic acid (7-ACA). Acylation of 7-ACA with an appropriate acyl halide, as for example thiophene-2-acetyl chloride, yields the desired 7-acylamidocephalosporanic acid antibiotic. The cephalosporin antibiotics obtained from cephalosporin C according to this method are derivatives of cephalosporanic acid which possesses an acetoxymethyl group attached at the 3-position of the cephalosporin nucleus. According to the cephem nomenclature system for the cephalosporins, Morin, Jackson, Flynn and Roeske, J. Am. Chem. Soc., 84, 3400 (1962), the cephalosporin antibiotics obtained from cephalosporin C are named 3-acetoxymethyl-7-acylamido-$\Delta^3$-cephem-4-carboxylic acids.

The second method by which the cephalosporin antibiotics can be produced involves the chemical conversion of a penicillin antibiotic. This method, described in U.S. Pat. No. 3,275,626, involves the conversion of the thiazolidine ring of a penicillin into the dihydrothiazine ring of a cephalosporin. The fused β-lactam ring of the penicillin molecule remains intact during the conversion. This chemical conversion is carried out by heating a penicillin sulfoxide in the presence of an acidic reagent, such as acetic anhydride, to obtain predominantly a 3-methyl-7-acylamido-$\Delta^3$-cephem-4-carboxylic acid ester (a desacetoxycephalosporanic acid) and a 3-acyloxy-3-methyl-7-acylamidocepham-4-carboxylic acid ester. Also produced in the chemical conversion process is a 2-acyloxymethylpenicillin, otherwise designated as a 2-methyl-2-acyloxymethyl-3-carboalkoxy-6-acylamidopenam. The latter product of the chemical conversion of a penicillin is further described in U.S. Pat. No. 3,466,275. As described in U.S. Pat. No. 3,275,626 a 2-acyloxymethylpenicillin can likewise be converted into a cephalosporin by a repetition of the conversion process, i.e. preparation of the 2-acyloxymethylpenicillin sulfoxide followed by heating in the presence of an acidic reagent.

Thus the chemical conversion method provides cephalosporin and penicillin antibiotics of the following structures according to the equation:

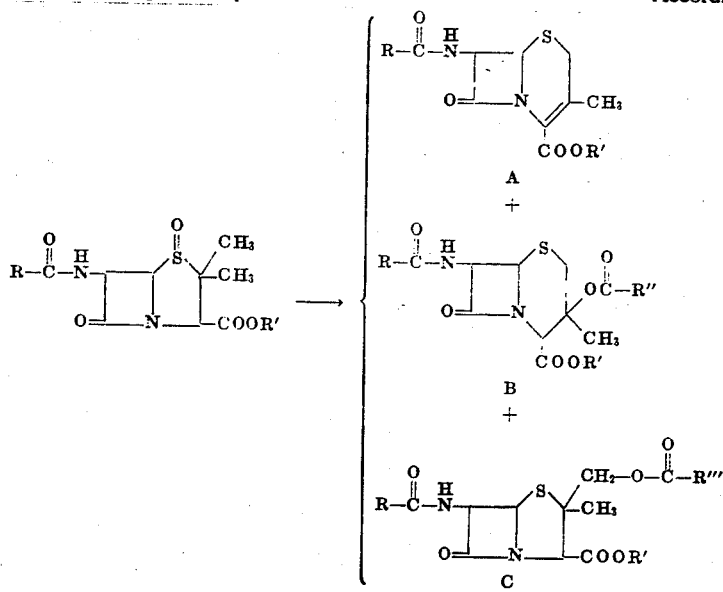

wherein R' is an organic radical, R" is a lower alkyl, aralkyl or aryl moiety and R''' is $C_1$ to $C_4$ alkyl. The 2-acyloxymethylpenicillin, product C, can be converted into a cephalosporanic acid ester according to the following general equation.

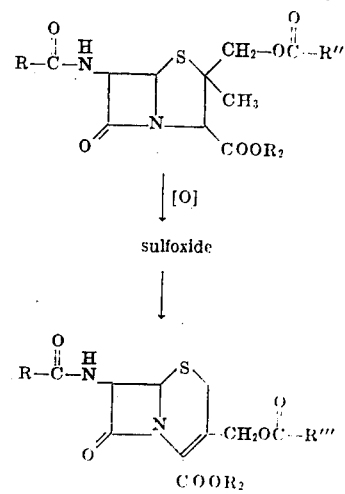

Although the chemical conversion method which employs the penicillin sulfoxide ester provides substantial yields of cephalosporin antibiotics having a 3-methyl substituent on the dihydrothiazine ring (a desacetoxycephalosporanic acid ester), the ring expansion of a 2-alkanoyloxymethyl-2-methyl-6-acylamidopenam-3-carboxylate, according to the known process, affords minor quantities of the desired 3-acyloxymethyl-7-acylamido-$\Delta^3$-cephem-4-carboxylate (a cephalosporanic acid ester).

One probable mechanism for the ring expansion would require that the sulfoxide bond and the unsubstituted 2-methyl group participate to form a cyclic intermediate. Hence, the sulfoxide bond should be in the cis position relative to the unsubstituted 2-methyl group in order to provide the spatial proximity necessary for the formation of the cyclic intermediate. It is suggested that the low yield of cephalosporanic acid ester in the prior art method is attributable to the configuration of the 2-alkanoyloxymethylpenicillin sulfoxide.

The present invention provides an improved method for the chemical conversion of a penicillanic acid to a cephalosporanic acid. In particular, this invention provides an improved process for the conversion of a 2-alkanoyloxymethylpenicillanic acid to a cephalosporanic acid.

SUMMARY

According to the present invention a 6-phthalimido-penicillanic acid ester represented by the formula

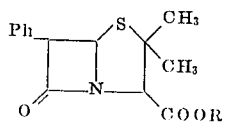

wherein Ph is phthalimido and R is methyl, benzyl, p-nitrobenzyl, benzyhydryl or 2,2,2-trichloroethyl, is reacted with an oxidizing agent, for example, sodium periodate, hydrogen peroxide or preferably an organic peracid such as peracetic acid, perbenzoic acid or m-chloroperbenzoic acid, to yield the corresponding 6-phthalimidopenicillanic acid ester α-sulfoxide. The penicillin sulfoxide is then heated for about 3 hours in the presence of an anhydride of a $C_2$-$C_5$ carboxylic acid in an atmosphere of an inert gas, at a temperature between about 90° and 125° C. to yield a reaction product mixture comprising a 2β-alkanoyloxymethyl-2α-methyl-6-phthalimidopenicillanic acid ester (I), a 2α-alkanoyl-oxymethyl-2β-methyl-6-phthalimidopenicillanic acid ester (II), a 3-methyl-7-phthalimido-$\Delta^3$-cephem-4-carboxylic acid ester (III), and a 3-alkanoyloxy-3-methyl-7-phthalimidocepham-4-carboxylic acid ester (IV), represented by the following formulas:

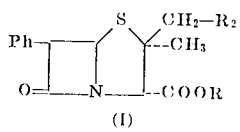

(I)

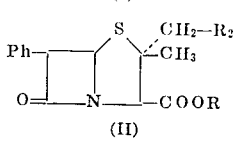

(II)

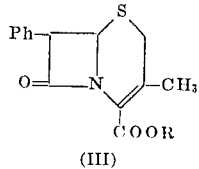

(III)

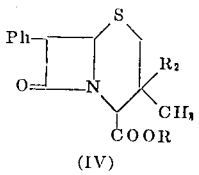

(IV)

wherein $R_2$ is $C_2$-$C_5$ alkanoyloxy and R is the same as defined above.

The reaction product mixture is reacted with an oxidizing agent, preferably m-chloroperbenzoic acid, to yield a mixture of the corresponding sulfoxides wherein the sulfoxide bond has the α-configuration. Chromatography of the mixture of sulfoxides over silica gel affords separation of the two isomeric penicillin sulfoxides from the other components of the mixture. The isolated 2β-alkanoyloxymethyl-2α-methyl-6-phthalimidopenicillanic acid ester α-sulfoxide is then heated in an acidic solution of acetic anhydride in dimethyl acetamide containing a small amount of p-toluenesulfonic acid monohydrate at a temperature between about 75° and 150° C. to effect ring expansion. There are recovered from the reaction mixture a 3-alkanoyloxymethyl-7-phthalimido-$\Delta^3$-cephem-4-carboxylic acid ester (V) and a 3 alkanoyloxymethyl-3 -hydroxy-7-phthalimidocepham-4-carboxylic acid ester (VI) represented by the formula

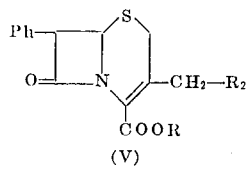

(V)

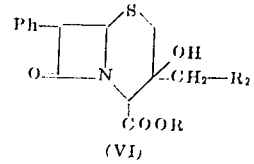

(VI)

wherein $R_2$ is $C_2$-$C_5$ alkanoyloxy and R has the same meaning as previously defined. The products can be separated and purified by chromatography.

The 7-phthalimido-$\Delta^3$-cephem ester (V) can be converted into cephalosporin antibiotics by known synthetic methods. The 3-hydroxy-7-phthalimidocepham ester (VI) can be dehydrated to provide additional quantities of the 7-phthalimido-$\Delta^3$-cephem ester.

DETAILED DESCRIPTION

The present invention provides an improved method for the chemical conversion of a penicillin into a cephalosporin.

The starting material employed in this invention is prepared by the reaction of 6-aminopenicillanic acid with N-carboethoxyphthalimide according to the method described by Sheehan et al, J. Am. Chem. Soc., 84, 2983 (1962). The phthalimido penicillanic acid is then esterified by known preparative methods to obtain a 6-phthalimidopenicillanic acid ester of the formula

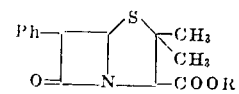

wherein Ph is phthalimido and R is methyl, benzyl, benzyhydryl, p-nitrobenzyl or 2,2,2-trichloroethyl. Oxidation of the ester so obtained with an active oxygen compound such as sodium periodate, hydrogen peroxide or an organic peracid, for example, peracetic, perbenzoic or preferably m-chloroperbenzoic acid, affords the corresponding α-sulfoxide as described in J. Am. Chem. Soc., 91, 1528 (1969).

The oxidation is conveniently carried out in an inert solvent such as the aromatic hydrocarbons for example, benzene, toluene, xylene and the like or the chlorinated hydrocarbons, for example, chloroform or methylene dichloride. By an inert solvent is meant one that is unreactive in the presence of the oxidizing agent and the penicillin ester under the conditions of the reaction. The preferred solvent is chloroform. The temperature of the reaction mixture is maintained below about 15° C. and preferably between about 0° and about 5° C.

The 6-phthalimidopenicillin ester sulfoxide is obtained in substantial yields by evaporation of the reaction mixture and chromatography of the residue according to the method described in J. Am. Chem. Soc., 91, 1528 (1969).

The 6-phthalimidopenicillin ester α-sulfoxide obtained thereby is heated in an atmosphere of an inert gas with an anhydride of a $C_2$-$C_5$ carboxylic acid from about 2 hours to about 5 hours at a temperature between about 90° and 125° C. to yield a mixture of products comprising the two isomeric 2-alkanoyloxy-methylpenicillin esters, 2β-alkanoyloxymethyl-2 α-methylpenicillanic acid ester I, a 2α-alkanoyloxymethyl-2β-methylpenicillanic acid ester II, a 3-methyl-7-phthalimido-$\Delta^3$-cephem-4-carboxylic acid ester III, and a 3-alkanoyloxy -3-methyl-7-phthalimidocepham-4-carboxylate IV.

The reaction is conveniently carried out in an excess of the desired anhydride which thereby provides the reaction solvent medium. The preferred reaction temperature is about 100° C.

The reaction is preferably carried out in an atmosphere of an inert gas. Inert gases such as helium, argon, neon and the like can be employed. The preferred inert gas used in this invention is helium.

The separation and isolation of the products comprising the reaction product mixture is difficult to accomplish at this stage of the process. It is preferable to achieve separation following the oxidation of the reaction product mixture, the corresponding penicillin sulfoxides being more easily separated and isolated as hereinafter described. Accordingly, the reaction product mixture is evaporated in vacuo to remove the excess acid anhydride and the solid residue containing all four products is oxidized under essentially the same conditions as described above for the oxidation of the starting material. An oxidizing agent such as sodium periodate, hydrogen peroxide or an organic peracid such as peracetic acid, perbenzoic acid, m-chloroperbenzoic acid or the like is suitable.

The preferred oxidizing agent is m-chloroperbenzoic acid and the reaction is preferably carried out at about 0° C.

The sulfoxides of the penicillins (I and II) of the oxidized reaction product mixture are separated from the sulfoxides of the cephalosporins (III and IV) and other minor components of the mixture by column chromatography. Adsorbents commonly employed in chromatography such as activated carbon, alumina and silica gel can be used. The preferred chromatographic adsorbent is silica gel (Merck AG, Darmstadt). The sulfoxides are eluted from the column by the gradient elution technique employing benzene → benzene-ethyl acetate, 1:1. Multiple fractions are collected and the presence of the individual sulfoxides among the various fractions is determined by nuclear magnetic resonance spectroscopy. Fractions containing the same substance are combined and evaporated to dryness in vacuo to obtain the individual sulfoxide esters. The compounds listed below exemplify the penicillin sulfoxide esters provided by the practice of this invention:

methyl 2β-acetoxymethyl-2α-methyl-6-phthalimidopenicillanate α-sulfoxide, methyl 2α-acetoxymethyl-2β-methyl-6-phthalimidopenicillanate α-sulfoxide, p-nitrobenzyl 2β-acetoxymethyl-2αmethyl-6-phthalimidopenicillanate α-sulfoxide, p-nitrobenzyl 2α-acetoxymethyl-2β-methyl-6-phthalimidopenicillanate α-sulfoxide, 2,2,2-trichloroethyl 2β-acetoxymethyl-2α-methyl-6-phthalimidopenicillanate α-sulfoxide, benzyl 2β-propionyloxymethyl-2α-methyl-6-phthalimidopenicillanate α-sulfoxide, diphenylmethyl 2β-acetoxymethyl-2α-methyl-6-phthalimidopenicillanate α-sulfoxide, p-nitrobenzyl 2β-isobutytyloxymethyl-2α-methyl-6-phthalimidopenicillanate α-sulfoxide, and p-nitrobenzyl 2β-pivalyloxymethyl-2α-methyl-6-phthalimidopenicillanate α-sulfoxide.

The designated configuration and structure of the products can be confirmed by nuclear magnetic resonance and infrared spectroscopy.

The 2-alkanoyloxymethylpenicillin-α-sulfoxide ester, for example, p-nitrobenzyl 2β-acetoxymethyl-2α-methyl-6-phthalimidopenicillanate α-sulfoxide is heated preferably in an atmosphere of an inert gas for about 2 hours to about 5 hours in a solution of an inert solvent containing an acid and dimethylacetamide to yield a 3-alkanoyloxymethyl-7-phthalimido-Δ³-cephem ester and a 3-alkanoyloxymethyl-3-hydroxy-7-phthalimido-4-carboxylate. Inert solvents which are suitable in the present reaction are the aromatic hydrocarbons, for example, benzene, toluene, or xylene or other common organic solvents which are unreactive under the conditions of the reaction. The preferred solvent of this invention is benzene. Acids which are suitably employed are the sulfonic acids such as p-toluenesulfonic acid, methane sulfonic acid or ethanesulfonic acid. Likewise, the acid anhydrides, such as acetic, propionic, butyric and the like are suitably employed as acidic substances in the present reaction. Any inert gas such as helium, argon or neon can be suitably employed. The reaction mixture is heated at a temperature from about 75° to about 150° C.

The preferred manner of reaction comprises heating the 2-alkanoyloxymethylpenicillin α-sulfoxide ester in an atmosphere of helium in a benzene solution containing p-toluenesulfonic acid in small amounts (about 10 percent or less of the sulfoxide by weight) and dimethylacetamide at a temperature of about 85° C.

Alternatively, the α-sulfoxide ester can be heated in a solution of an anhydride of an alkylcarboxylic acid and dimethylacetamide containing an acid such as p-toluenesulfonic or methanesulfonic acid. Acid anhydrides of the lower alkylcarboxylic acids such as acetic anhydride, propionic anhydride, or butyric anhydride can be employed as the solvent. The preferred anhydride in the alternative method is acetic anhydride. The reaction is carried out at a temperature between about 75° and about 150° C. The preferred temperatures is about 85° C. Following either method, the reaction mixture is degassed in vacuo prior to heating and is stirred in an atmosphere of helium during the reaction period. Generally the reaction mixture is allowed to cool to room temperature following the heating period and allowed to stand with stirring for about 10 hours prior to work up. The reaction mixture is washed to remove acidic materials and evaporated to dryness in vacuo. The residual solid comprising the above described cephalosporin esters is purified and the products isolated by chromatography. Suitable chromatographic adsorbents commonly employed in the separation and purification of antibiotic substances such as alumina, activated carbon and silica gel can be used in the present separation. The preferred adsorbent is silica gel (Merck A.G. Darmstadt). A ratio of crude residue to chromatographic absorbent of from about 1:30 to about 1:50 by weight provides convenient separation. The column is eluted with the gradient elution system of benzene → benzene-ethyl acetate, 1:1. Multiple fractions are collected and the progress of the chromatogram is followed by the NMR spectra of the collected fractions.

The novel 3-alkanoyloxymethyl-3-hydroxycepham-4-carboxylic ester (VI) provided by the present process is readily converted into the corresponding Δ³-cephem compound (V) by dehydration. The dehydration is conveniently carried out by heating the 3-hydroxycepham-4-carboxylic ester (VI) in an acidic medium, for example, acetic anhydride containing a small amount of an acid such as p-toluenesulfonic acid or methanesulfonic acid. The dehydration can likewise be accomplished in refluxing benzene containing an acid such as p-toluenesulfonic acid under a Dean-Stark trap providing for continuous water removal from the reaction mixture.

The cephalosporin products provided by the improved process described herein are useful intermediates for the synthesis of cephalosporin antibiotics. For example, the 4-ester group of the 7-phthalimidocephalosporins can be converted to the 4-carboxylic acid group to provide the compounds described by U.S. Pat. No. 3,117,126. The methyl ester can be saponified in strong base. When the ester is benzyl, benzhydryl or p-nitrobenzyl, removal of the ester group can be achived by catalytic debenzylation in the presence of a supported palladium hydrogenation catalyst in an atmosphere of hydrogen. The 2,2,2-trichloroethyl group is conveniently removed by chemical reduction in acetic acid in the presence of metallic zinc according to the method described in U.S. Pat. No. 3,449,336.

Alternatively, the 7-phthalimido-Δ³-cephem ester (V) can be reacted with hydrazine according to the method described in U.S. Pat. No. 3,487,071 to obtain the corresponding 7-amino-cephalosporanic acid ester, which can then be acylated with an organic acylating agent by methods known to those skilled in the art to obtain the desired cephalosporin antibiotic. Acylating agents such as thiophene-2-acetyl chloride, phenoxyacetyl chloride, α-aminophenylacetyl chloride and α-hydroxyphenylacetyl chloride are but representative of the wide variety of organic acylating agents which have been described as producing highly efficacious 7-acylamidocephalosporanic acid antibiotics.

Likewise the 3-alkanoyloxymethyl-3-hydroxy-7-phtahlimidocepham-4-carboxylic acid ester (VI) can be reacted with hydrazine to provide a 3-alkanoyloxymethyl-3-hydroxy-7-aminocepham-4-carboxylic acid ester represented by the formula

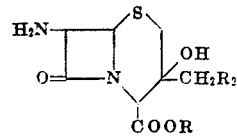

wherein R and R$_2$ have the same meaning as previously defined. The 7-amino-3-hydroxycepham ester of the above formula can be dehydrated under acidic conditions analogous to those employed in the dehydration of the corresponding 7-phthalimido-3-hydroxy-cepham ester (VI), to provide a 3-alkanoyloxymethyl-7-amino-Δ$^3$-cephem-4-carboxylic acid ester.

As previously mentioned, the improvement in the chemical conversion process for producing a cephalosporanic acid from a 2-alkanoyloxy-2-methylpenicillin ester embodied in the present invention comprises the use of a 6-phthalimidopenicillin ester α-sulfoxide. By employing a 6-phthalimidopenicillin ester sulfoxide as the starting material in the chemical conversion process, substantial quantities of the 2β-alkanoyloxymethyl-2α-methyl penicillin ester are produced. Oxidation of this intermediate provides in turn substantial quantities of a 2β-alkanoyl-oxymethyl-2α-methylpenicillin ester α-sulfoxide in which the sulfoxide bond and the methyl group in the 2-position have the cis configuration required for cyclic intermediate formation.

The 2β-alkanoyloxymethyl-2α-methylpenicillin ester α-sulfoxide when subjected to the ring expansion conditions provides a 3-alkanoyloxy-Δ$^3$-cephem ester and a 3-hydroxy-3-alkanoyloxy-methylcepham-4-carboxylic acid ester.

Those skilled in the art will recognize other aspects and features of the present invention not specifically mentioned or delineated herein. For example, diacyl moieties other than phthaloyl, which are capable of forming a 6-imide group with the 6-aminosubstituent of penicillanic acid can function to a greater or lesser degree than the 6-phthalimido group in providing the desired penicillin sulfoxide process intermediate. Such 6-imide groups as succinimido and maleimido are examples.

The following examples are presented to more fully illustrate the present invention without limiting it in any way.

EXAMPLE 1

To a cold solution of 19.4 g. of methyl 6-phthalimidopenicillanate in 500 ml. of chloroform was added with stirring a solution of 10.7 g. of m-chloroperbenzoic acid in 200 ml. of chloroform. Addition of the peracid required 30 minutes while the temperature of the reaction mixture was kept below 15° C. Stirring was continued for 16 hours at room temperature thereafter, and the reaction mixture washed successively with a solution of sodium bicarbonate, a saturated solution of sodium chloride, and was then dried over sodium sulfate. The dried reaction mixture was evaporated to dryness in vacuo to yield a pale yellow residue. Chromatography of the residue over silica gel by gradient elution with benzene → 50 percent benzene-ethyl acetate (1:1) yielded 16.6 g. of methyl 6-phthalimidopenicillanate α-sulfoxide as described in J. Am. Chem. Soc., 91, 1528 (1969).

EXAMPLE 2

A solution of 10.0 g. of methyl 6-phthalimidopenicillanate α-sulfoxide in 200 ml. of freshly distilled acetic anhydride was degassed in vacuo and then heated with stirring in an atmosphere of helium for 3 hours at a temperature of 100° C. The reaction mixture was evaporated to dryness in vacuo to yield a frothy yellow residue. The residue was dissolved in 100 ml. of chloroform and the solution cooled to 0° C. A solution of 4.0 g. of m-chloroperbenzoic acid in 50 ml. of chloroform was added with stirring and the reaction mixture allowed to warm to room temperature. The reaction mixture was washed with a saturated solution of sodium bicarbonate followed by a brine wash before drying over sodium sulfate. Evaporation of the dried reaction mixture yielded a white, frothy residue. The residue was chromatographed over a column measuring 2.8 × 31 cm., packed with 60 g. of silica gel. The column was eluted by gradient elution with the solvent system, benzene → 50 percent benzene-ethyl acetate. Elution was carried out at a flow rate of 1.3 ml. per minute and 140 fractions of 10 ml. each were collected. The following distribution of products in the collected fractions was determined by NMR.

| Fraction No. | Weight (g.) | Product |
| --- | --- | --- |
| 1–49 | 0.134 | unidentified |
| 50–53 | 0.062 | A[1] + B[2] |
| 54–56 | 0.06 | A + B |
| 58–60 | 0.209 | 75%A + 25%B |
| 57, 61–63 | 0.446 | 67%A + 33%B |
| 64–69 | 1.00 | 33%A + 67%B |
| 70–75 | 0.92 | 15%A + 85%B |
| 76–90 | 1.57 | 10%A + 90%B |
| 91–140 | 2.44 | 75%C[3] + 25%B |

[1] 2α-acetoxymethyl-2β-methyl-6-phthalimidopenicillanic acid methyl ester α-sulfoxide

[2] 2β-acetoxymethyl-2α-methyl-6-phthalimidopenicillanic acid methyl ester α-sulfoxide

[3] 3-methyl-3-acetoxy-7-phthalimidocepham-4-carboxylic acid methyl ester sulfoxide, and 3-methyl-7-phthalimido-Δ$^3$-cephem-4-carboxylic acid methyl ester.

The isomeric products 2α-acetoxymethyl-2β-methyl-6-phthalimido-penicillanic acid methyl ester α-sulfoxide and 2β-acetoxymethyl-2α-methyl-6-phthalimidopenicillanic acid methyl ester α-sulfoxide were separated and isolated as colorless oils on further chromatography over silica gel by gradient elution with benzene → 50 percent benzene-ethyl acetate. The following observed values express the nuclear magnetic resonance spectrum, infrared spectrum and mass spectrum of the respective isomers:

2β-acetoxymethyl-2αmethyl-6-phthalimidopenicillanic acid methyl ester α-sulfoxide.

Empirical Formula: $C_{19}H_{18}N_2O_8S$

NMR δ(CDCl$_3$)
1.32 (s, 3, α-methyl)
2.23 (s, 3, acetyl)
3.85 (s, 3, carbomethoxy)
4.41, 4.68
(J/AB=12, 2, CH$_2$OAc)
4.88 (s, 1, H$_3$)
4.87 (d, J=4, 1, H$_5$)
5.89 (d, J=4, 1, H$_6$)
7.9 (M, 4, aromatic)

6 percent Nuclear Overhauser Effect —α methyl H$_5$

I.R. (CHCl$_3$) Absorption maxima:
1806 (imide), 1785 (β-lactam), 1750, 1730, 1055 (S → O)cm$^{-1}$.

Mass ion 434. 2α-acetoxymethyl-2βmethyl-6-phthalimidopenicillanic acid methyl ester α-sulfoxide Empirical formula: $C_{19}H_{18}N_2O_8S$ NMR δ(CDCl$_3$)
1.84 (s, 3, β-methyl)
2.08 (s, 3, acetoxy)
3.81 (s, 3, carbomethoxy)
4.35, 4.48
(J/AB=13, 2, CH$_2$OAc)
4.67 (s, 1, H$_3$)
5.04 (d, J=4, 1, H$_5$)
5.88 (d, J=4, 1, H$_6$)
7.9 (M, 4, aromatic)

19 percent Nuclear Overhauser Effect — β-methyl H$_3$

I.R. (CHCl$_3$) Absorption maxima:
1808 (imide), 1780 (β-lactam), 1745, 1725, 1050 (S → O)cm$^{-1}$.

EXAMPLE 3

Methyl 2β-acetoxymethyl-2α-methyl-6-phthalimidopenicillanate α-sulfoxide, 171 mg., was added to a solution of 1 ml. of acetic anhydride in 10 ml. of dimethylacetamide containing 40 ml. of p-toluenesulfonic acid monohydrate and the mixture heated with stirring for 3 hours under an atmosphere of helium at a temperature of 84° C. The pale yellow reaction mixture was evaporated to dryness in vacuo to yield a pale yellow residual oil. The yellow oil was chromatographed over a column measuring 2.5 cm × 9.0 cm. packed with 15 g. of silica gel. Gradient elution with benzene → 50 percent ethyl acetate-benzene at a flow rate of 4.6 ml. per minute gave the following results.

| Fraction No. | Product weight (mg.)[1] |
|---|---|
| 1–16 | — |
| 16–18 | 5 |
| 19–23 | 12 |
| 26–29 | 28 |
| 30–34 | 1 |
| 36–43 | 40 |
| 44–70 | 56 |

[1] Residual weight following evaporation of combined fractions. Fractions 19–23 contained 12 mg. of the rearrangement product methyl 7-phthalimidocephalosporanate. The product proved to be identical to a sample of methyl 7-phthalimidocephalosporanate prepared as described below in Example 5, when the NMR, thin later chromatograms and infrared spectra of the two samples were compared.

Fraction 26 to 29 yielded 28 mg. of 3-acetoxymethyl-3-hydroxy-7-phthalimidocepham-4-carboxylic acid methyl ester, melting at about 237°–238° C. Elemental analysis calculated for $C_{19}H_{12}N_2O_8S$:

Theory: C, 52.54; H, 4.18; N, 6.45; S, 7.38
Found: C, 52.71; H, 4.26; N, 6.91; S, 7.28

The infrared absorption spectra in chloroform showed absorption maxima at 1788, 1777 and 1725 cm$^{-1}$.

EXAMPLE 4

To a vigorously stirred solution of 5 g. of 7-aminocephalosporanic acid and 1.95 g. of sodium carbonate in 30 ml. of water was added 4.03 g. of N-ethoxycarbonylphthalimide. The reaction mixture was stirred at room temperature for 3 hours, filtered and the filtrate acidified with hydrochloric acid. The precipitate was filtered and dried at room temperature to yield 4.3 g. of 7-phthalimidocephalosporanic acid. The acid was converted to the methyl ester in the following manner. The acid was dissolved in methylene dichloride and an ethereal solution of diazomethane added. An immediate evolution of nitrogen occurred accompanied by the formation of a precipitate. The reaction mixture was evaporated to dryness in vacuo to yield a residual oil. The oil was chromatographed over silica gel to yield the purified product methyl 7-phthalimidocephalosporanate. The nuclear magnetic resonance spectrum and infrared spectrum were in agreement with the designated structure of the product.

EXAMPLE 5

To a well stirred slurry of 42.2 g. of 6-phthalimidopenicillanic acid in 500 ml. of acetone maintained at a temperature of −10° C. was added by dropwise addition 12.4 g. of triethylamine. To the resultant solution, 26.4 g. of p-nitrogenzylbromide was added portionwise. The reaction mixture was then stirred for 3 hours at room temperature, and was then poured into ice water with the formation of a white precipitate. The precipitate was filtered, washed with copious amounts of water, and slurried in ether. The precipitate was filtered and dried in vacuo at 50° C. for 4 hours to yield 41.7 g. of 6-phthalimidopenicillanic acid p-nitrobenzyl ester.

EXAMPLE 6

To a solution containing 40 g. of 6-phthalimidopenicillanic acid p-nitrobenzyl ester, prepared according to the method described by Example 5, in 600 ml. of chloroform was added, with stirring, a solution of 16.8 g. of m-chloroperbenzoic acid in 350 ml. of chloroform. The reaction mixture was stirred at room temperature overnight and then washed twice with a saturated solution of sodium bicarbonate and twice with a saturated sodium chloride solution. The washed reaction mixture was dried, evaporated to dryness and the solid residue crystallized from acetone to yield 25 g. of 6-phthalimidopenicillanic acid p-nitrobenzyl ester α-sulfoxide.

EXAMPLE 7

To 500 ml. of freshly distilled acetic anhydride was added 24 g. of 6-phthalimidopenicillanic acid p-nitrobenzyl ester α-sulfoxide and the solution degassed in vacuo. The reaction solution was then heated with stirring for 3 hours in an atmosphere of helium at a temperature of 95° C. After the initial reaction period at 95° C. the reaction mixture was allowed to stand for 16 hours at room temperature. The pale yellow reaction solution was evaporated in vacuo to yield a white frothy residue. The residue was chromatographed over a column measuring 4.5 × 26.5 cm. packed with 150 g. of silica gel. Elution was carried out with benzene-ethyl acetate (1:1) at a flow rate of 3.5 ml. per minute. Sixty fractions of 21 ml. each were collected and fractions 41 through 60 were combined and evaporated to yield 13.3 g. of reaction product mixture comprising the p-nitrobenzyl esters of the following acids:

2α-acetoxymethyl-2β-methyl-6-phthalimidopenicillanic acid,
2βacetoxymethyl-2α-methyl-6-phthalimidopenicillanic acid,
3-methyl-7-phthalimido-Δ$^3$-cephem-4-carboxylic acid and
3-acetoxy-3-methyl-7-phthalimidocepham-4-carboxylic acid.

The reaction product mixture, 13.3 g., was dissolved in 250 ml. of chloroform and a solution of 4.9 g. of m-chloroperbenzoic acid in 250 ml. of chloroform added dropwise with stirring at a temperature of about 0° C. After the addition of peracid was complete, the reaction mixture was allowed to stir overnight at room temperature. The pale yellow reaction solution was washed with a saturated solution of sodium bicarbonate, a saturated solution of sodium chloride and dried over sodium sulfate. Evaporation of the dried reaction solution gave a solid yellow residue comprising the corresponding sulfoxides of the aforementioned p-nitrobenzyl ester penicillins.

The residue was chromatographed over a column measuring 4.5 × 19 cm. packed with 100 g. of silica gel (Merck A.G. Darmstadt). The column was eluted with the gradient benzene and ethyl acetate and 210 fractions of 18 ml. each were collected. Fractions 77–84 contained 1.7 g. of 2β-acetoxymethyl-2α-methyl-6-phthalimidopenicillanic acid p-nitrobenzyl ester α-sulfoxide as a clear water white oil. The infrared absorption spectrum in chloroform shows absorption maxima at 1805 (imide), 1780 (β-lactam), 1700, 1728, and 1055 (S → O) cm$^{-1}$. Nuclear magnetic resonance: 9 percent Nuclear Overhauser Effect -2α-methyl-H$_5$ δ(CDCl$_3$)  1.27 (s, 3, α-methyl)
2.23 (s, 3, acetyl)
4.45,4.69 (J/AB=12,2,CH$_2$OAc)
4.91 (d, J=4, 1, H$_5$)
4.97 (s, 1, H3)
5.40 (s, 2, p-nitrobenzyl)
5.92 (d, J=4, 1, H$_6$)
7.63, 8.29
(J/AB=9, 4, p-nitrophenyl)
7.87 (m, 4, phthalimido)

EXAMPLE 8

A solution of 506 mg. of 2β-acetoxymethyl-2α-methyl-6-phthalimidopenicillanic acid p-nitrobenzyl ester α-sulfoxide in 20 ml. of dimethylacetamide containing 2 ml. of acetic anhydride and 10 mg. of p-toluenesulfonic acid monohydrate was heated with stirring for 5 hours in an atmosphere of helium at a temperature of about 84° C. The reaction mixture was then stirred at room temperature for 11 hours. The brown reaction mixture was evaporated in vacuo to yield a brown oily residue. The oily residue was chromatographed over silica gel (ratio of residue to adsorbent 1/31 by weight) using a benzene → 50 percent benzene-ethyl acetate gradient for elution to yield 83 mg. of 3-acetoxymethyl-3-hydroxy-7-phthalimidocepham-4-carboxylic acid p-nitrobenzylester, and 11 mg. of 3-acetoxymethyl-7-phthalimido-Δ$^3$-cephem-4-carboxylic acid p-nitrobenzyl ester. (CDCl The NMR spectrum of the product, 3-acetoxymethyl-3-hydroxy-7-phthalimidocepham-4-carboxylic acid p- nitrobenzyl ester, gave the following observed values in agreement with the structure.

δ(DCDl₃)  2.03 (s, 3, acetyl)
2.62, 3.49
(J/AB=14, 2,2-thiomethylene)
4.05, 4.24
(J/AB=12, 2, acetoxymethyl)
4.86 (s, 1, H₄)
5.30 (s, 2, p-nitrobenzyl)
5.45 (d, J=4, 1, H₆)
5.62 (d, J=4, 1, H₇)
8.0 (aromatic)

The nuclear magnetic resonance spectrum of the product 3-acetoxymethyl-7-phthalimido-Δ³-cephem-4-carboxylic acid p-nitrobenzyl ester is comparable with that of a sample prepared from 7-ACA. The following observed values describe the NMR spectrum of the product obtained by the present process.

δ(CDCl₃)  2.08 (s, 3, acetyl)
3.52 (M, 2, 2-thiomethylene)
5.06 (d, J=4, 0, 1, H₆)
4.81 (s, 2, acetoxymethyl)
5.40 (s, 2, p-nitrobenzyl)
5.82 (d, J=4, 2, H₇)
7.8 (aromatic)

I claim:

1. The process for converting a 6-phthalimidopenicillanic acid ester to a 7-phthalimidocephalosporanic acid ester which comprises a) reacting a compound of the formula

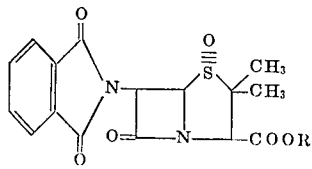

with the anhydride of a C₂-C₅ carboxylic acid at a temperature between 90° and 125° C. to obtain a mixture of the compounds of the formulas

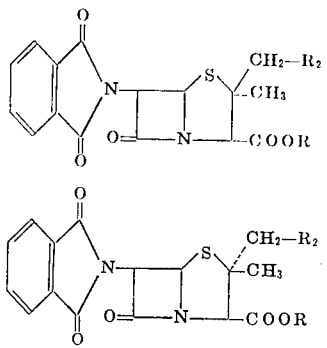

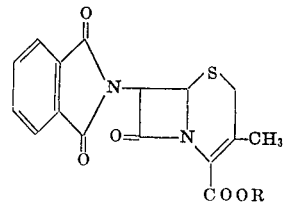

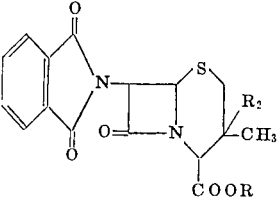

b) reacting the mixture with an active oxygen compound in an inert solvent at a temperature between 0° and 15° C. to obtain a mixture of sulfoxides of the formulas

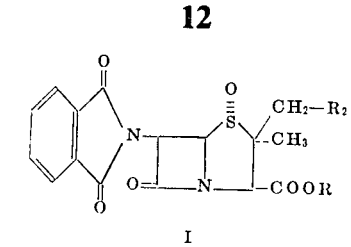
I

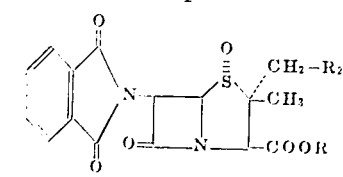
II

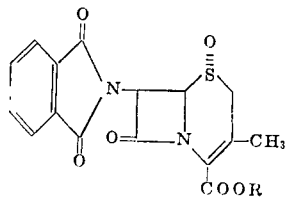
III

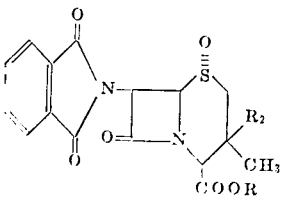
IV c) separating the mixture to obtain the individual sulfoxides, and d) heating the sulfoxide of formula I in an inert solvent in the presence of an acid at a temperature between 75° and 150° C. to produce a cephalosporanic acid ester of the formula

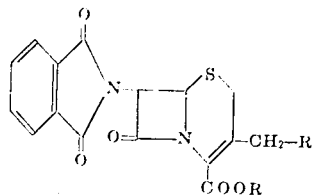

and a compound of the formula

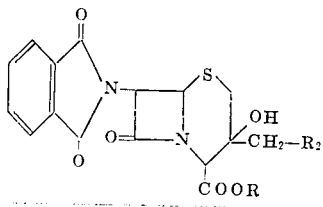

where in the above formulas R is methyl, benzyl, benhydryl, p-nitrobenzyl or 2,2,2-trichloroethyl and R₂ is C₂-C₅ alkanoyloxy.

2. A compound of the formula

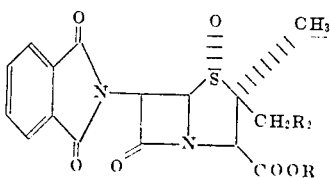

wherein R is methyl, benzyl, benzyhydryl, p-nitrobenzyl or trichloroethyl, and $R_2$ is $C_2$–$C_5$ alkanoyloxy.

3. The compound of claim 2 said compound being 2β-acetoxymethyl-2α-methyl-6-phthalimidopenicillanic acid methyl ester α-sulfoxide.

4. The compound of claim 2 said compound being 2β-acetoxymethyl-2α-methyl-6-phthalimidopenicillanic acid p-nitrobenzyl ester α-sulfoxide.

5. A compound of the formula

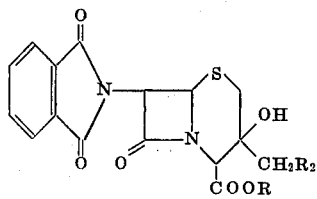

wherein R is methyl, benzyl, benzyhydryl, p-nitrobenzyl or 2,2,2-trichloroethyl and $R_2$ is $C_2$–$C_5$ alkanoyloxy.

6. The compound of claim 5 said compound being 3-acetoxymethyl-3-hydroxy-7-phthalimidocepham-4-carboxylic acid methyl ester.

7. The compound of claim 5 said compound being 3-acetoxymethyl-3-hydroxy-7-phthalimidocepham-4-carboxylic acid p-nitrobenzyl ester.

8. A compound of the formula

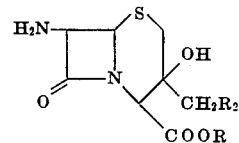

wherein R is methyl, benzyl, benzhydryl, p-nitrobenzyl or 2,2,2-trichloroethyl and $R_2$ is $C_2$–$C_5$ alkanoyloxy.

* * * * *